Oct. 30, 1923.
J. A. PILCHER
CAR CONSTRUCTION
Filed Feb. 11, 1921     2 Sheets-Sheet 2
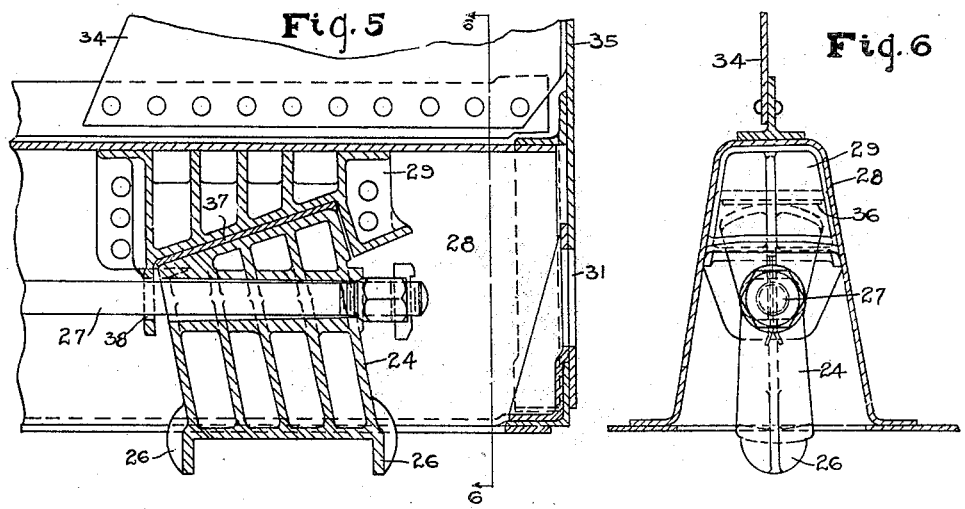
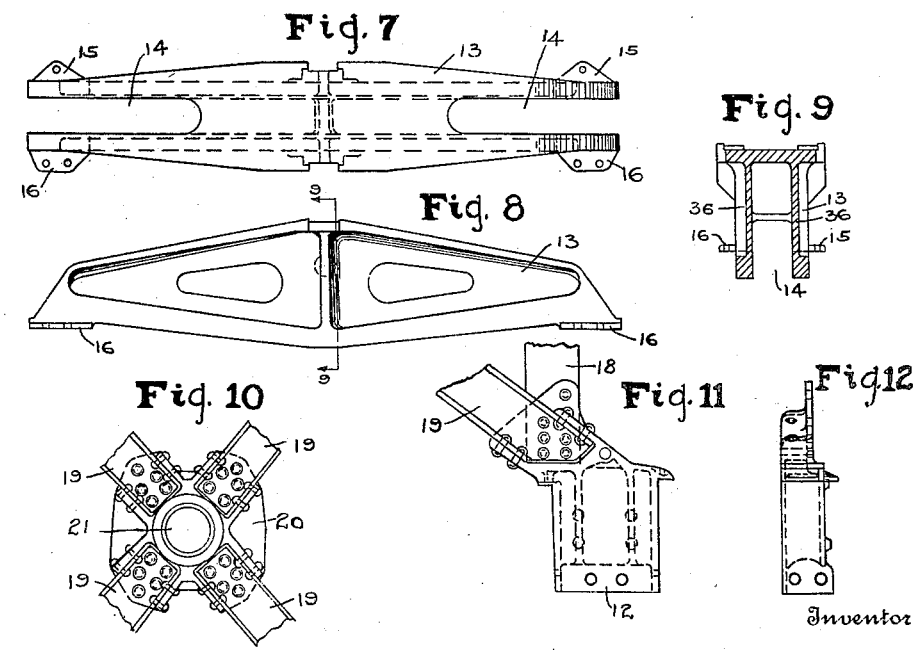
Witness
M. H. Martin.
Inventor
JOHN A. PILCHER
By B. W. Kadel
Attorney Patented Oct. 30, 1923.

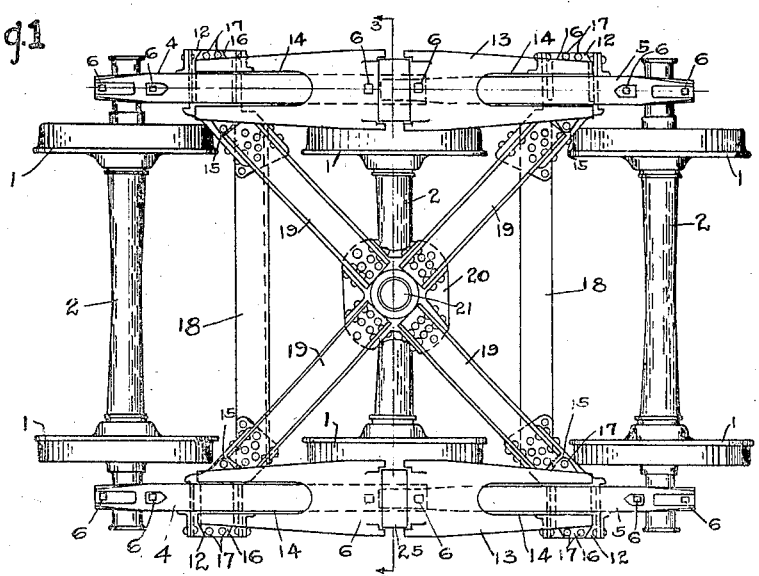

1,472,135

UNITED STATES PATENT OFFICE.

JOHN A. PILCHER, OF ROANOKE, VIRGINIA.

CAR CONSTRUCTION.

Application filed February 11, 1921. Serial No. 444,168.

*To all whom it may concern:*

Be it known that I, JOHN A. PILCHER, a citizen of the United States, residing at Roanoke, in the county of Roanoke and State of Virginia, have invented certain new and useful Improvements in Car Construction, of which the following is a specification.

This invention relates to car trucks and has among its objects to provide improved means for supporting the car body and for distributing the superimposed car body loads among the various wheels of the truck. In general, the load from the car body has heretofore been applied to each of two trucks at a single point, usually denoted the center plate. Hence the weights upon the center plates are not subject to change due to warping of the car body under abnormal track conditions. But by supporting the load, as in the present invention, at two points upon each truck, one over or near each side frame member, much material can be saved in both the car body and the truck, and the first cost thereby greatly reduced, as well as contributing to continual lower operating costs. But the problem of unequal loading becomes important when a car body is supported at four points instead of two, for as the trucks pass over unequal track there is a tendency not only to change the loading upon the four supporting points but also to produce changes in wheel loadings within each of the trucks.

It is to provide means for overcoming both of these difficulties that the present invention is directed and it is particularly intended for use in connection with cars having twelve or more wheels.

With the foregoing general ideas in view the invention consists of the formation, combination and arrangement of various elements co-ordinated to produce improvements generally in this art.

In the drawings, Figure 1 is a plan view of a six wheel truck constructed in accordance with the principles of the present invention. Figure 2 is a side elevational view of the same. Figure 3 is a transverse vertical section taken through the center of the truck and showing the manner of supporting the end of the car body upon the truck structure. This section is taken on a plane approximately co-incident with the line 3—3 of Figure 1. Figure 4 is a side elevational view, to a somewhat enlarged scale of the portion of the car body immediately over the center of the truck. Figure 5 is a fragmentary sectional view showing in enlarged scale a portion of the car body at the same point as shown in Figure 3. Figure 6 is a vertical sectional view of a portion of the car body over the truck, the section being taken on the line 6—6 of Figure 5. Figure 7 is a plan view of one of the truck equalizer members, and Figure 8 a side elevational view of the same. Figure 9 is a transverse sectional view of the same, taken on the line 9—9 of Figure 8. Figure 10 is a plan view of the center pivot construction of the truck. Figure 11 is a plan view of a combined squaring arm and spring cap as used in the present embodiment of the truck and Figure 12 an end elevational view of the same.

Referring now to these drawings, which show one embodiment of the invention, the truck shown has six wheels 1, mounted in pairs upon axles 2. The axles are journaled in the usual oil boxes 3 which are secured to the side frame members 4 and 5 by means of the bolts 6 and box tie bars 7 and 8. The side frames are outside of the wheels, thereby making the distance from the side of the car into the side frames relatively short. This is of importance in the present method of supporting and carrying the car body inasmuch as the moments in the body bolster are proportionally reduced. It will be noted that each side frame section 4 carries one end oil box and one middle oil box, the other frame section 5 carrying the other end oil box. The two frame sections are hinged together for vertical movement at 9, immediately over the middle oil boxes. The frame sections at the two sides of the truck are similar in this respect. This is the well known "Lewis" truck construction.

Each of the four frame sections has the customary bolster window opening 10 with load-carrying springs 11 positioned within this opening and supported directly upon the side frame sections. The springs are so located along the frame sections as to put an equal load upon each oil box on a side of the truck when equal loads are applied to the two groups of springs along that side of the truck.

Resting upon the top of the springs 11 and guided for slidable movement in the window openings 10 in the side frame sections are spring caps 12 which also serve, with certain later described cross members, as guides, or means for holding the side frames in correct positions both laterally and longitudinally of the truck and for taking care of lateral and longitudinal forces.

The load of the car body is applied to the spring caps 12 by means of the central equalizer beams 13. There is one of these equalizers at each side of the truck, extending from one spring cap to the other at that side of the truck. Each of the equalizers 13 is preferably cast in a single piece but is bifurcated at its ends, as at 14, to provide a space for the upper portions of the side frame sections 4 and 5 and to permit vertical movement of these equalizers upon the springs 11. The equalizers are connected above the interval that is provided for the side frames between the side portions 36 of the equalizer, the space being only sufficient for necessary clearances. The equalizers rest upon the spring caps 12 and the ends of the same are provided with pierced flanges 15 and 16 so that the equalizers may be rigidly attached to the spring caps as by means of the rivets 17. It will thus be seen that the load is all carried on line with the side frames of the truck, none of it being applied at the center.

The four spring caps 12 of each truck are joined together and held in constant relationship transversely and longitudinally of the truck by means of a frame work of structural steel consisting of a pair of direct cross members 18 and a set of X-members 19, these together with the central pivot casting 20 constituting a frame of platform construction. The X-members are joined together at the center of the truck by means of the pivot casting 20, this latter having a vertical opening 21 for co-operation with a trunnion 22 which depends from the car body. A horizontally arranged bolt or rod 23 may be applied through these members to prevent separation of the truck and body in the case of a derailment.

It will be understood that the casting 20, together with the frame work, does not receive the vertical load of the body at the center of the truck. The trunnion or pivot is provided and arranged for swiveling and guiding purposes and to hold the truck and body together against horizontal displacement. The lateral forces from the body are transmitted to the truck largely through these members, however, and all the forces from impact of cars and the retarding forces from brake applications are transmitted through the same. Hence laterally and longitudinally this frame work that connects the spring caps and that carries the center pivot is made exceedingly stiff and rigid. In the horizontal plane, however, it is desired that the wheels may have practically unrestricted vertical play with respect to each other so as to follow any conditions of track surface without change of wheel loads and accordingly without hindrance from this frame work. It is accordingly made exceedingly flexible in this plane. By this means it is allowed to warp itself with practically no change in the loads upon the groups of springs 11 and also without setting up disastrous stresses in the various members of the frame work.

The car body load is applied to the equalizer beams 13 at the center of the latter and directly over the side frames of the truck by means of the conical rollers or rockers 24. A steel bearing plate 25 is inserted beneath each rocker because of the concentration of weight and flanges 26 are provided on the ends of the rockers to overlie the sides of the equalizers in order to keep the rockers in position transversely of the truck upon the equalizers. The lower faces of the rockers and the seats for the same upon the equalizers are substantially horizontal, while the top surfaces of the rockers and the seats for the same upon the car body are inclined. By this means the necessary swiveling action of the truck beneath the car body is obtained and at the same time all spreading tendencies from the conical rollers are kept out of the truck and are restricted to the body where they are more easily taken care of. The rockers are held against the spreading action by means of the transverse tie rod which connects the rockers of each truck. This tie rod is denoted 27 in the drawings. The car body rests upon the top surfaces of the two rockers 24 of each truck, thereby being supported at four points. The ordinary open top car has enough flexibility to admit of its being supported at four such points, as the body will warp itself enough to prevent any disastrous changes in load upon the rockers.

The car body is preferably formed in a special manner for use with this method of load carrying. In the absence of a center bearing plate the body bolster 28 may be made of less strength and weight than usual and is preferably formed of a steel plate bent into trough shape and extending up into the cavity of the car. The cavity of the trough is open from beneath the car and the rockers 24 and tie rod 27 are disposed within this space as otherwise it would be difficult to provide the necessary space for these members. Upper bearing castings 29 are secured to the bolster 28 immediately over the rockers and these transmit the loads from the bolster to the rockers, steel bearing plates 37 being applied between the castings and the rockers. The bolster 28 is securely attached to the car sides by means of rivets 30, a large part of the load being applied to the bolster by the car sides. Holes 31 are cut in the car sides at the ends of the bolsters 28 and through these the rocker tie rod 27 may be passed. The tie rods 27 also pass through openings 38 formed in the castings 29. By this means the tie rods together with the rockers will be lifted with the car body when untrucking.

The holes 31 are also serviceable for the insertion of crane hooks when it is desired to lift the car.

The car has the customary center sills 32 which receive the draft forces. The casting 33, which carries the body pivot 22, is secured between the center sill channels 32.

Brace plates 34 extend upward from the bolster 28 to stiffen and brace the car sides 35.

I have thus provided an improved method of carrying the weight of a car in a satisfactory manner and have provided a truck and car body arrangement of lower first cost, less weight, and great economy of operation. The load from the car sides is not carried in to the usual center plate by the body bolster and then back to the side frames of the truck by means of a truck bolster, but is transferred from the body of the car to the truck side frames directly on line with the latter. By eliminating many of the customary load-carrying parts and reducing the size of others, the construction is greatly simplified and more of the space about the truck is made available for such accessories as the brakes.

Having thus described a preferred embodiment of my invention, what I claim is:

1. In a car truck having a plurality of wheels and axles, side members extending between the axles, a centrally arranged equalizer member associated with the side members and supported thereby, a load receiving seat upon each equalizer member, and a rotatable load transferring member operable upon the said seat.

2. In a car truck having more than two axles, each with the customary wheels mounted thereupon, side members extending between the axles, an equalizer member on each side associated with each side member and supported thereupon, the same being arranged to receive car body loads at a single central point and transfer the same to the side members, and springs interposed between the ends of the equalizer members and the side members.

3. In a car truck having a plurality of wheels and axles, sectional side members connecting the axles, the sections of each member being articulated with respect to each other, an equalizer member spanning between adjacent side member sections and supported thereupon, and a car body supporting seat upon each equalizer member.

4. In a car truck having a plurality of wheels and axles, axle-connecting members along each side of the truck, a plurality of load-applying seats associated in yieldable fashion with each of the said axle-connecting members, said seats being arranged to apply loads from the car body to the axle-connecting members, and a frame work connecting the said load-applying seats, and means for transferring loads from the car body to the said load-applying seats independently of the said frame work.

5. In a car truck having a plurality of wheels and axles, side members arranged to connect the axles and to transfer loads thereto, means for applying car body loads to each side member at a plurality of points, and spring supported means connecting the side members, the same being arranged to hold them in substantial alignment longitudinally and laterally of the truck, but to permit of their relative displacement vertically, independently of the spring action.

6. In a car truck having a plurality of wheels and axles, side members arranged to connect the axles and to transfer loads thereto, a platform member connecting the side members, the same being constructed in rigid fashion and to withstand heavy thrusts in the horizontal plane and to offer no substantial resistance against flexure in the vertical planes.

7. In a car truck having a plurality of wheels and axles, a two-part, jointed side frame along each side of the truck, load-receiving seats upon each part of each side frame, springs upon the load-receiving seats, equalizers resting at their ends upon the springs, and seats upon the equalizers arranged to receive loads from the car body.

8. In car construction, a car body, a supporting truck, and load-transferring members interposed therebetween, the said body having a transversely arranged bolster member with a cavity in its lower face, the said load-transferring members being disposed within the said cavity.

9. In a car truck having more than two axles, each with the customary wheels mounted thereupon, side members at opposite sides of the truck arranged to transfer loads to the axles, means for applying car body loads to the side members, springs interposed between the car body and the axles, and load-equalizing means associated therewith, the same being arranged to cushion the load of the car body before the same is applied to the axles and also to equalize it thereamong, and a member of platform construction extending from the side member at one side of the truck to the one at the opposite side thereof, the same being affixed to the side members and arranged to hold them in substantial alignment longitudinally and transversely of the truck, but to permit of their relative displacement vertically without materially affecting the equalizing action of the said springs and load-equalizing means.

In testimony whereof I affix my signature.

JOHN A. PILCHER.